US007005834B2

(12) United States Patent
Iwasaki et al.

(10) Patent No.: US 7,005,834 B2
(45) Date of Patent: Feb. 28, 2006

(54) SYNCHRONOUS RECTIFIER CIRCUIT AND POWER SUPPLY

(75) Inventors: Takayuki Iwasaki, Hitachi (JP); Kozo Sakamoto, Hitachinaka (JP); Masaki Shiraishi, Hitachi (JP); Nobuyoshi Matsuura, Takasaki (JP); Tomoaki Uno, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/882,672

(22) Filed: Jul. 2, 2004

(65) Prior Publication Data

US 2005/0007078 A1 Jan. 13, 2005

(30) Foreign Application Priority Data

Jul. 2, 2003 (JP) ............................ 2003-189941

(51) Int. Cl.
*G05F 1/613* (2006.01)
*G05F 1/656* (2006.01)

(52) U.S. Cl. ....................... 323/222; 323/282; 323/274

(58) Field of Classification Search ................ 323/222, 323/282, 284, 274, 277

See application file for complete search history.

(56) References Cited

U.S. PATENT DOCUMENTS

| | | | | |
|---|---|---|---|---|
| 5,920,475 | A * | 7/1999 | Boylan et al. | 363/127 |
| 6,087,813 | A * | 7/2000 | Tobita | 323/280 |
| 6,356,064 | B1 * | 3/2002 | Tonda | 323/313 |
| 6,894,468 | B1 * | 5/2005 | Bretz et al. | 323/274 |

* cited by examiner

*Primary Examiner*—Bao Q. Vu
(74) *Attorney, Agent, or Firm*—McDermott Will & Emery LLP

(57) ABSTRACT

In a power supply of a synchronous rectification type, the self-turn on phenomenon of MOSFET is suppressed without increase of the drive loss to thereby improve the power efficiency. In a synchronous rectifier circuit, a threshold value of a commutation MOSFET is made higher than that of a rectification MOSFET and particularly a threshold value of a commutation MOSFET 3 is made 0.5V or more higher than that of a rectification MOSFET 2. The threshold value of the rectification MOSFET 2 is lower than 1.5V and the threshold of the commutation MOSFET 3 is higher than 2.0V.

10 Claims, 10 Drawing Sheets

Vth = 2.39V

Vth = 2.89V

Vth = 3.39V

SYNCHRONOUS RECTIFIER CIRCUIT AND POWER SUPPLY

BACKGROUND OF THE INVENTION

The present invention relates to a power supply and more particularly to a synchronous rectifier circuit and a power supply used in electronic equipment.

A conventional power supply as shown in FIG. 2 is known in which DC electric power inputted from a DC input power supply 60 to an input unit 51 including an input condenser 61 is switched by a switching unit 52 on the basis of a control signal produced by a driving unit 70 to supply electric power to a load 66 from an output unit 53 including a diode 63 and an output filter 55. Further, a voltage or a current supplied to the load 66 is detected by a detection unit 67 and the detected value is compared with a control target value for the load 66 set in a setting unit 68 by a comparison operation unit 69, so that the control signal based on its comparison result is supplied from a driving unit 70 to the switching unit 52.

A definite circuit of the power supply of FIG. 2 is schematically illustrated in FIG. 3. The switching unit 52 is constituted by an active element (for example, transistor, power MOSFET or the like. In the description of this invention, power MOSFET is simply referred to as MOSFET.) 62. The output unit 53 includes a commutation diode 63 and the output filter 55 composed of a choke coil 64 and a condenser 65. A control unit 54 includes the comparison operation unit 69, the setting unit 68 and the driving unit 70. Further, the control unit 54 includes an oscillation circuit not shown and supplies a pulse signal from the driving unit 70 to the active element 62 to thereby switch a DC voltage Vin applied to the active element 62 from the DC input power supply 60.

In the power supply shown in FIG. 3, when the active element 62 is on, the DC electric power is charged in the choke coil 64 and the condenser 65 and supplied to the load 66. When the active element 62 is off, the energy charged in the choke coil 64 and the condenser 65 is supplied to the load 66 through the commutation diode 63.

At this time, in the control unit 54, the comparison operation unit 69 monitors an output voltage Vo detected by the detection unit 67 and compares the detected output voltage Vo with the control target value set in the setting unit 68 to thereby supply the control signal based on the comparison result from the driving unit 70 to the switching unit 52. Thus, the active element 62 is turned on and off to control so that the electric power supplied to the load is equal to the control target value. The output voltage Vo at this time is expressed by the following equation (1):

$$VO=Vin\times(Ton/T) \tag{1}$$

where Vin represents the DC input voltage, T a period of the pulse signal produced by the driving unit 70, and Ton an on time of the active element 62 within the period T. That is, Ton/T represents a duty ratio.

FIG. 5 illustrates another conventional power supply of the synchronous rectification type using an MOSFET on the commutation side. The power supply has a smaller voltage drop as compared with the case of the diode since the current-to-voltage characteristic of the MOSFET is linear depending on a gate voltage thereof.

FIG. 7 schematically illustrates a feedback capacitance Crss and a gate-to-source capacitance Ciss of a commutation MOSFET 3 of the power supply of the synchronous rectification type. Referring now to FIG. 7, the phenomenon of turning on the commutation MOSFET 3 in the off state when a rectification MOSFET 2 is turned on, that is, the so-called "self-turn on" phenomenon is described. When the rectification MOSFET 2 is turned on in the case where the commutation MOSFET 3 is in the off state, the drain voltage of the commutation MOSFET 3 is suddenly changed to the voltage Vin of an input power supply 1 and accordingly the gate-to-source capacitance Ciss is charged through the feedback capacitance Crss, so that the commutation MOSFET 3 which must be in the off state originally is turned on. In other words, when the gate-to-source voltage Vgs of the commutation MOSFET 3 represented by the following equation (2) exceeds a threshold voltage Vth, the self-turn on phenomenon occurs.

$$Vgs=(Crss/Ciss+Crss)\times dVds \tag{2}$$

where dVds represents a changed amount of the drain-to-source voltage of the commutation MOSFET 3.

A semiconductor integrated circuit such as a microprocessor is supposed as the load of the power supply of the synchronous rectification type shown in FIGS. 5 and 7. Recently, there is the tendency that an operating voltage of the semiconductor integrated circuit is reduced, and an output voltage of the power supply is also required to be reduced in response to the reduced operating voltage of the semiconductor integrated circuit. On condition that the voltage of the DC input power supply is fixed, the on time Ton of the rectification MOSFET 2 represented by the equation (1) is made short and the on time of the commutation MOSFET is made long to thereby reduce the output voltage.

MOSFETs used in the switching power supply such as the power supply of the synchronous rectification type are different from ideal switches and produce loss. The loss can be divided into the loss produced in the on state of the MOSFET, that is, the conduction loss and the loss produced when it changes from the off state to the on state or from the on state to the off state, that is, the switching loss.

In the power supply having a low output voltage, the loss of the rectification MOSFET 2 having the short on time is predominantly the switching loss and the loss of the commutation MOSFET 3 having the long on time is predominantly the conduction loss.

The conduction loss is proportional to the on resistance which is a resistance of the MOSFET in the on state thereof and the switching loss is proportional to a feedback capacitance. Accordingly, an MOSFET having the small feedback capacitance is used for the rectification MOSFET 2 in which the switching loss is predominant and an MOSFET having a small on resistance is used for the commutation MOSFET 3 in which the conduction loss is predominant to thereby reduce the total loss.

Further, as shown in FIG. 9, it is heretofore known that a parallel circuit composed of a resistor 21 and a diode 22 is connected to the gate of the rectification MOSFET 2 in order to reduce or shorten the time that the rectification MOSFET 2 is turned on. A gate voltage of the rectification MOSFET 2 rises slowly because of the resistor 21, so that the changed amount dVds of the drain voltage Vds represented by the equation (2) is small and accordingly the self-turn on phenomenon is difficult to occur. On the other hand, the pulling out of electric charges in the gate of the rectification MOSFET 2 upon turning off is made at high speed since the charges pass through the diode 22.

Moreover, as shown in FIG. 10, it is heretofore known that a capacitor 23 and a discharge resistor 24 are connected to the gate of the commutation MOSFET 3. In this prior art, the gate voltage is supplied through the capacitor 23 and accordingly when the electrical potential at the gate terminal 25 is changed from a positive potential to a ground potential, a gate potential 26 of the commutation MOSFET 3 is driven to a negative potential, so that the commutation MOSFET 3 is difficult to occur when the rectification MOSFET 2 is turned on.

SUMMARY OF THE INVENTION

The conventional power supply shown in FIG. 3 uses the diode which is a passive element disposed on the commutation side of the output unit 53. The commutation diode 63 has the current-to-voltage characteristic as shown in FIG. 4 and when the current thereof exceeds a predetermined value, the forward voltage is saturated. This saturated voltage is about 0.9 to 1.3 V for a high-speed diode and about 0.45 to 0.55 V for a Schottky diode. Accordingly, there is a problem that the power loss is produced by the diode and the power conversion efficiency is deteriorated. Further, the power loss is increased and the temperature at the junction of the element rises and accordingly there is a problem that the larger the output current is, the more the commutation diodes 63 (2 or 3 diodes) are connected in parallel, so that it is necessary that the power loss per element is dispersed to suppress the junction temperature.

In the conventional power supply shown in FIGS. 5 and 7, when the self-turn on phenomenon occurs, the rectification MOSFET 2 and the commutation MOSFET 3 are turned on simultaneously, so that the excessive loss is produced and the factor of deterioration of the efficiency is caused to thereby break the element due to generation of heat in the worst case.

The MOSFETs used in the conventional power supply shown in FIGS. 5 and 7 produce the loss differently from the ideal switch. Generally, there is the relation that the MOSFET having a small on resistance has a large feedback capacitance and the MOSFET having a small feedback capacitance has a large on resistance. FIG. 8 shows the relation of the on resistance and the feedback capacitance and there is a tradeoff relation therebetween. Accordingly, there is a problem that since the commutation MOSFET 3 having a small on resistance is selected, the feedback capacitance Crss thereof is increased, so that the self-turn on phenomenon is apt to occur.

In the prior art shown in FIG. 9, since the rectification MOSFET 2 turns on slowly, the turning-on loss of the rectification MOSFET 2 is increased.

The prior art shown in FIG. 10 has a problem that the drive loss of the commutation MOSFET 3 is increased because of the charge and discharge loss of the capacitor 23.

It is an object of the present invention to solve the above problems by providing a power supply having small loss and which can suppress the self-turn on phenomenon without increased drive loss.

The power supply of the present invention includes a commutation MOSFET and a rectification MOSFET, which are insulated gate type power semiconductor elements, constituting a synchronous rectifier circuit and a threshold value of the commutation MOSFET is higher than that of the commutation MOSFET.

Other objects, features and advantages of the invention will become apparent from the following description of the embodiments of the invention taken in conjunction with the accompanying drawings.

DESCRIPTION OF THE EMBODIMENTS

Figure 5:
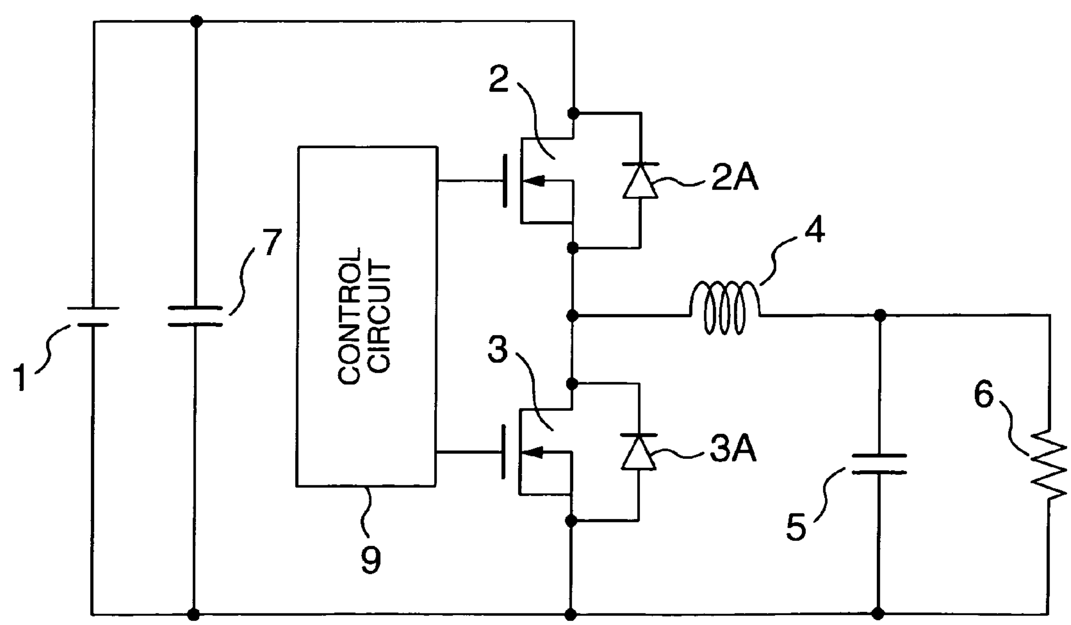
FIG. 5 is a schematic diagram illustrating a conventional power supply.
Figure 6:
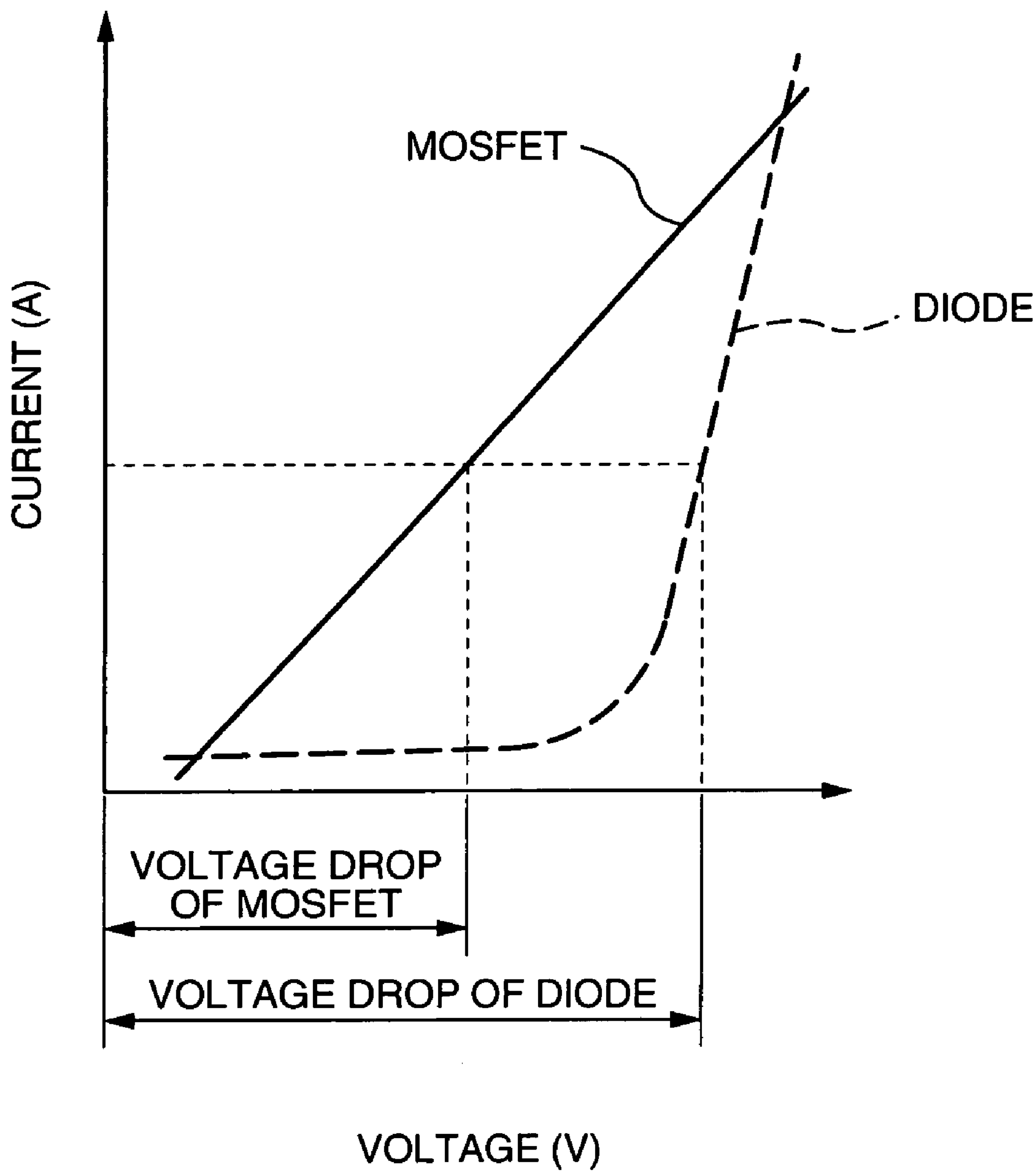
FIG. 6 is a graph showing the relation of voltage drops and currents of a diode and an MOSFET.
Figure 7:
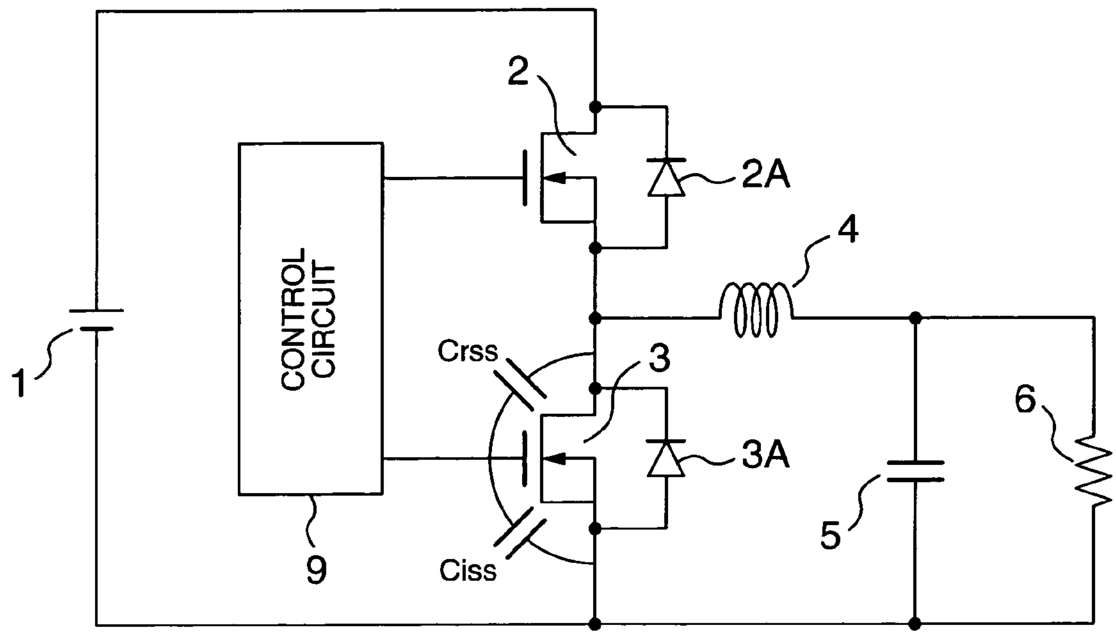
FIG. 7 is a diagram explaining parasitic capacitances of a commutation MOSFET.
Figure 8:
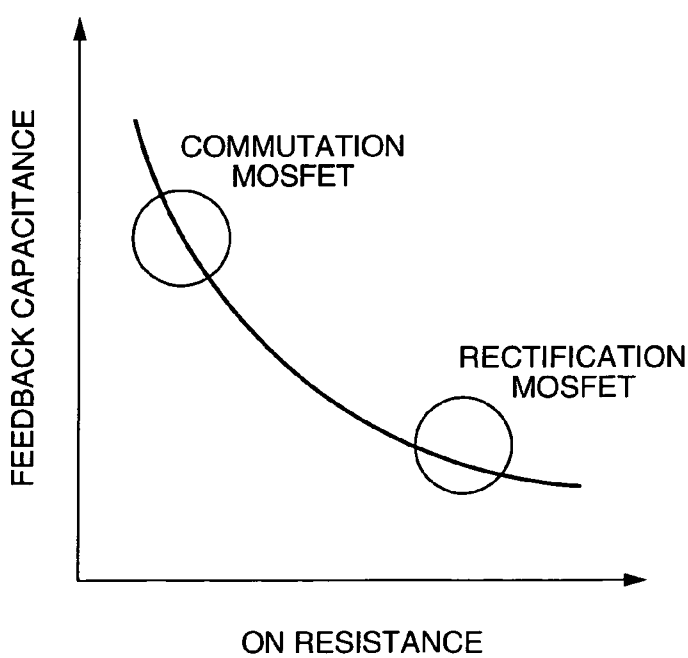
FIG. 8 is a graph showing the relation of an on resistance and a feedback capacitance.
Figure 9:
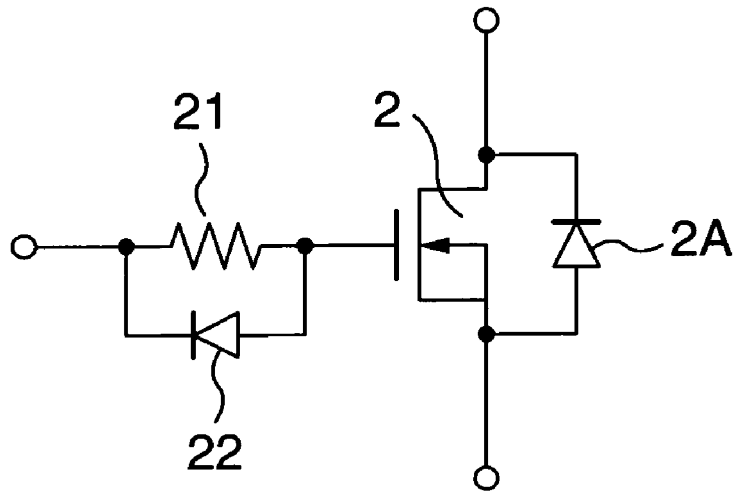
FIG. 9 is a diagram schematically illustrating a rectification MOSFET used in a conventional power supply.
Figure 10:
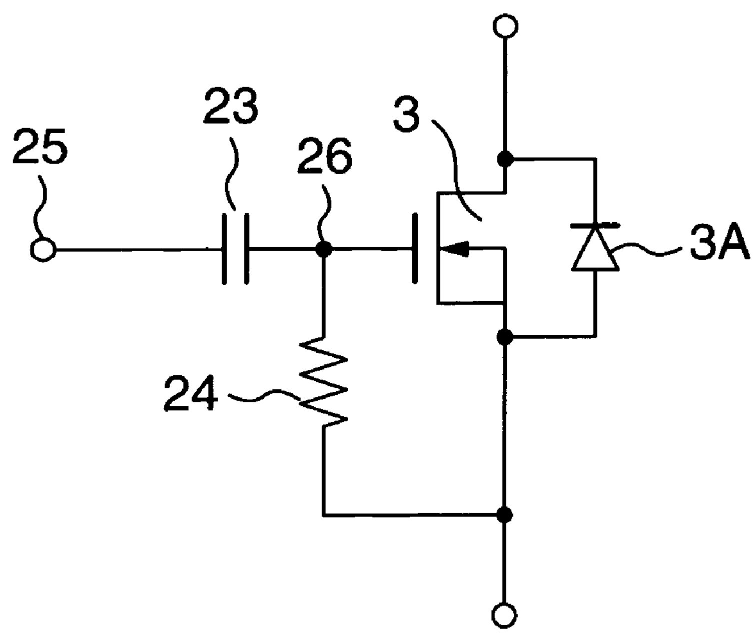
FIG. 10 is a diagram schematically illustrating a commutation MOSFET used in a conventional power supply.

The present invention is now described in detail with reference to the accompanying drawings. A power supply of the present invention has the same circuit configuration as that of FIG. 5 used in description of the prior art. As shown in FIG. 5, the power supply of the present invention includes the rectification MOSFET 2 and the commutation MOSFET 3 and a DC input power supply 1 is connected to a drain terminal of the rectification MOSFET 2. A source terminal of the rectification MOSFET 2 is connected to one terminal of a choke coil 4 and a drain terminal of the commutation MOSFET 3. The other terminal of the choke coil 4 is connected to one terminal of a condenser 5 (for example, electrolysis condenser) and a load resistor 6. The other terminal of the condenser 5 is connected to a ground terminal.

Figure 1:
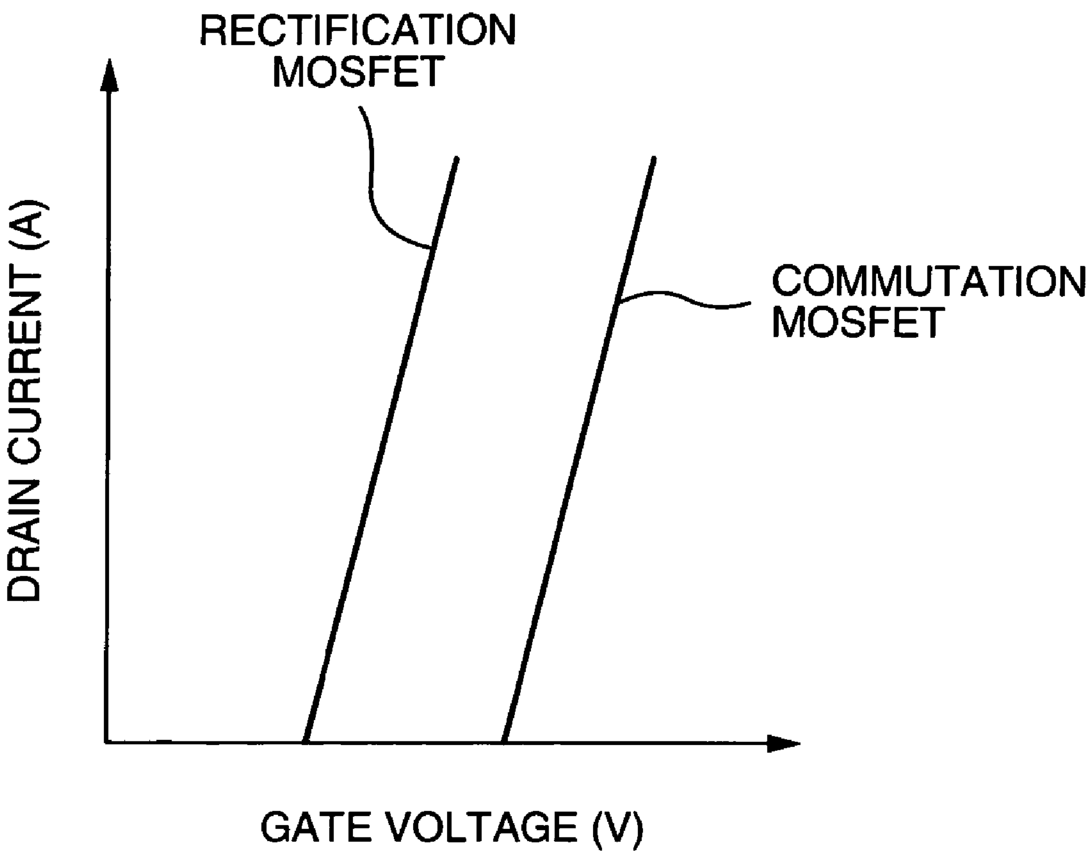
FIG. 1 is a graph explaining the characteristics of MOSFETs of a power supply of the present invention.
Figure 2:
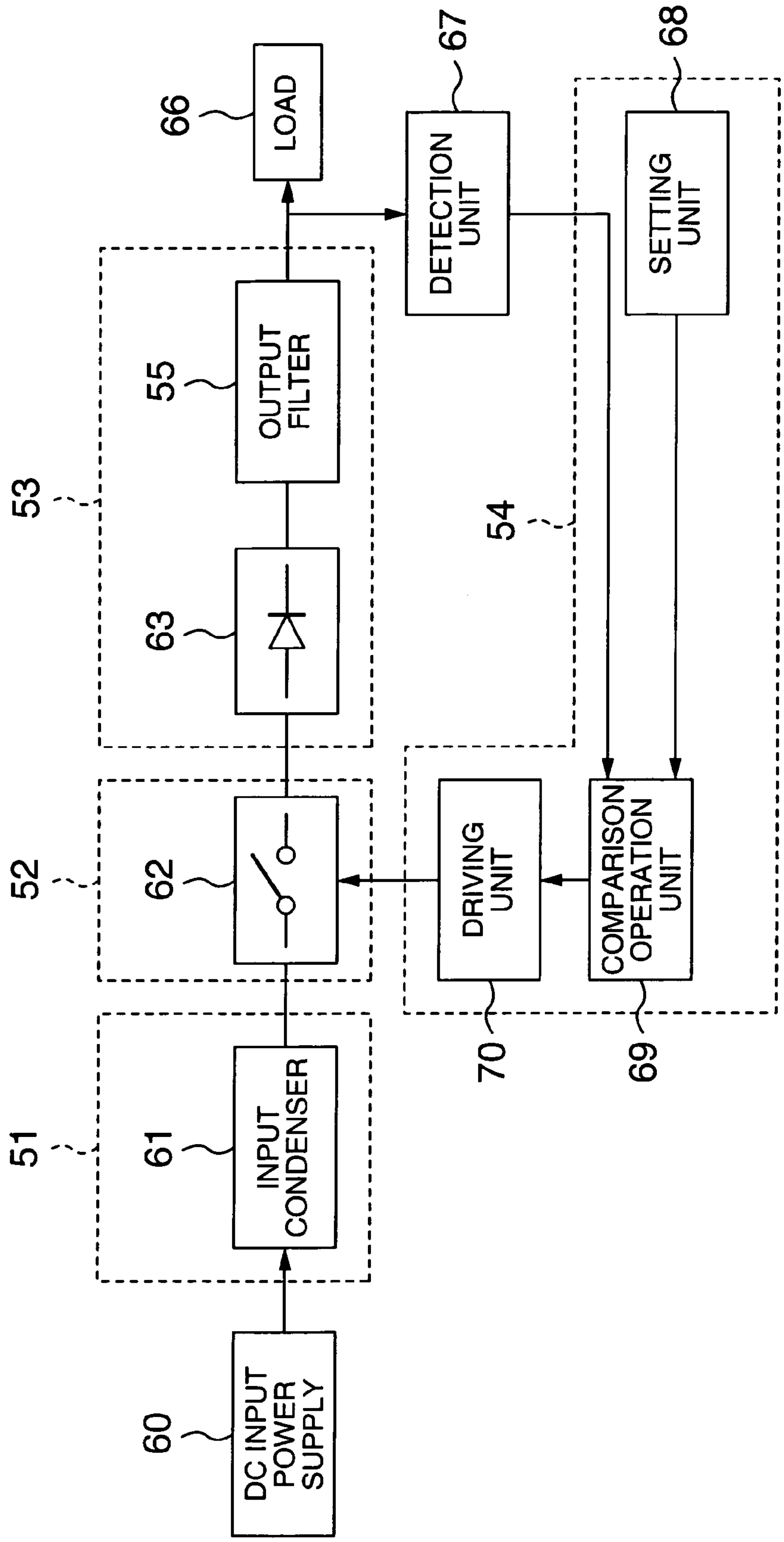
FIG. 2 is a schematic diagram illustrating a conventional power supply.
Figure 3:
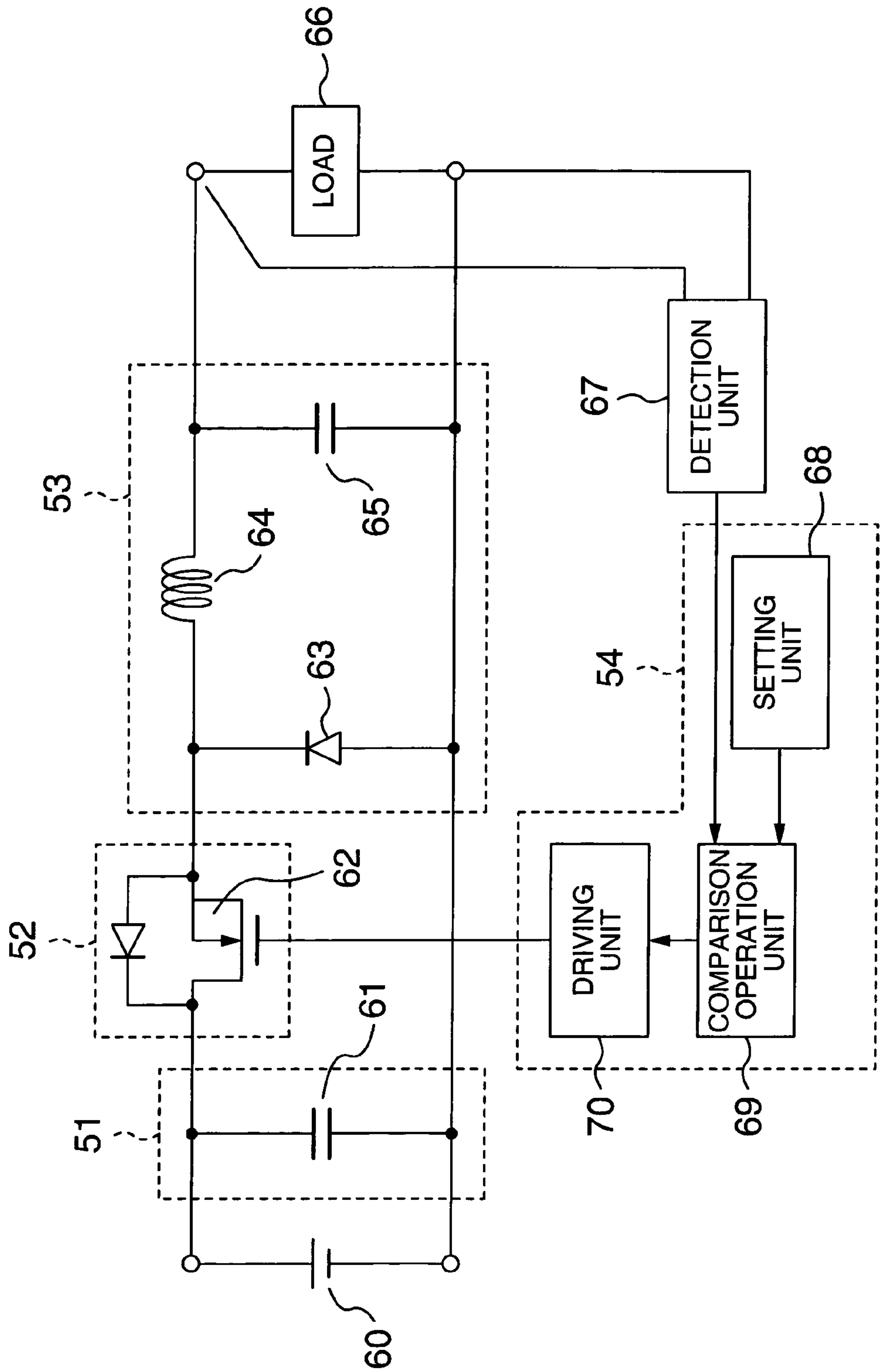
FIG. 3 is a schematic diagram illustrating a conventional power supply.
Figure 4:
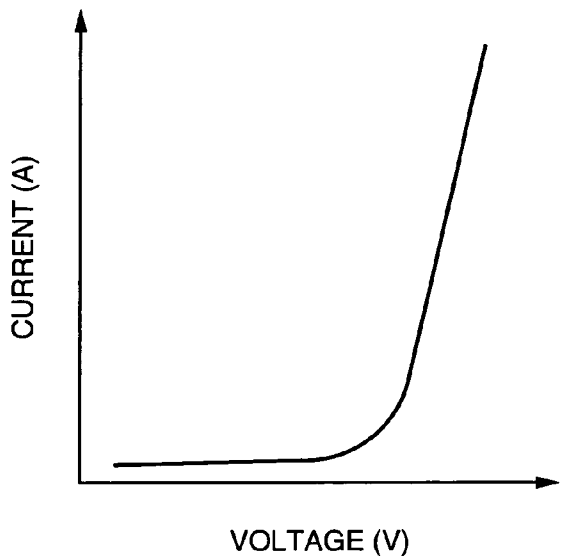
FIG. 4 is a graph showing the relation of a voltage drop and a current of a diode.

The threshold values of the rectification MOSFET 2 and the commutation MOSFET 3 used in the power supply of the present invention are shown in FIG. 1. In FIG. 1, the abscissa axis represents a gate voltage and the ordinate axis represents a drain current. In the power supply of the present invention, the threshold values of the commutation MOSFET 3 and the rectification MOSFET 2 are different and the threshold value of the commutation MOSFET 3 is higher than that of the rectification MOSFET 2.

In the specification, the threshold value is defined to be a voltage between the gate and the source of the MOSFET when the drain current of 1 mA is conducted or flows on condition that a voltage between the drain and the source is 10V.

Figure 11:
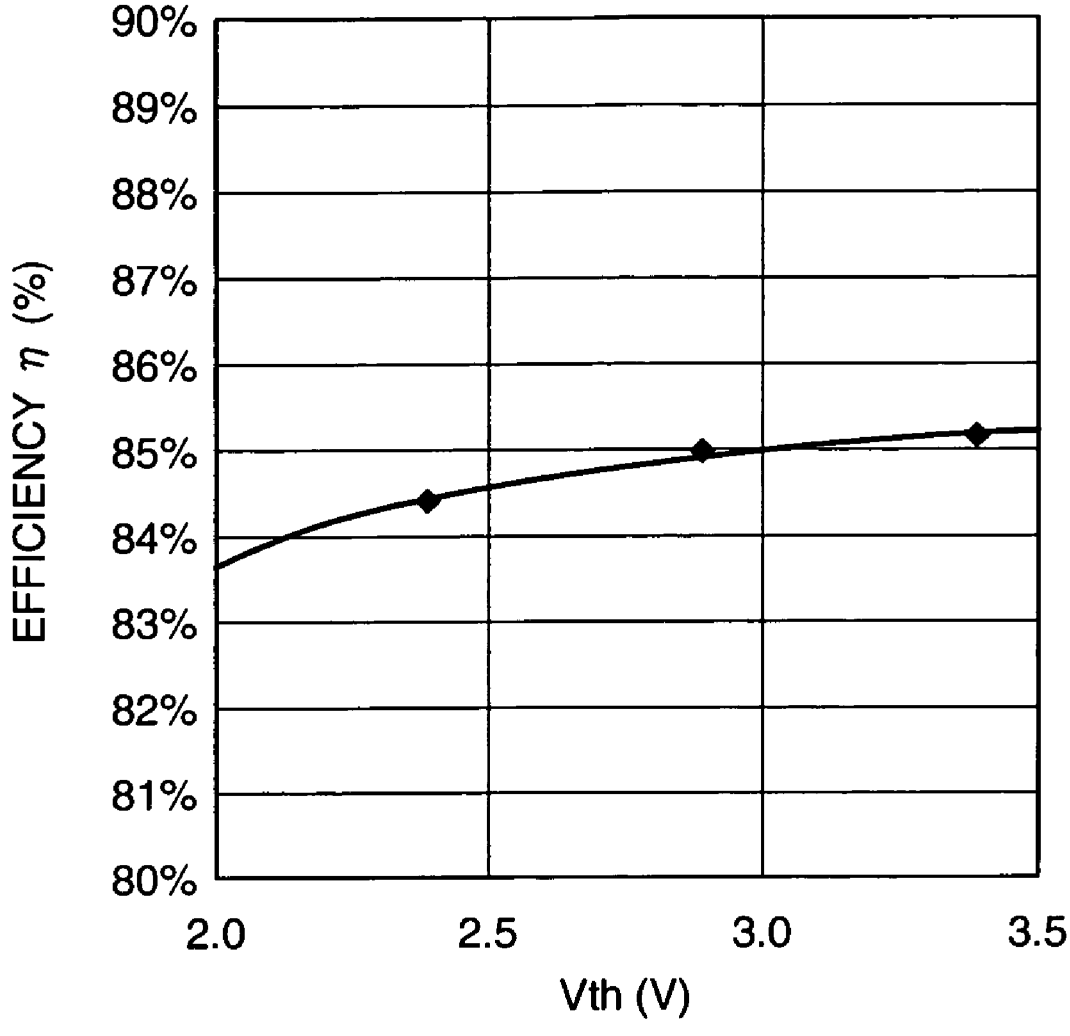
FIG. 11 is a graph explaining the relation of a threshold value and the efficiency of the MOSFET used in the power supply of the present invention.

FIG. 11 is a graph showing the relation of a threshold value Vth of the commutation MOSFET 3 represented in the abscissa axis and the power efficiency η represented in the ordinate axis. As shown in FIG. 11, the higher the threshold value is, the larger the power efficiency is.

Figure 12:
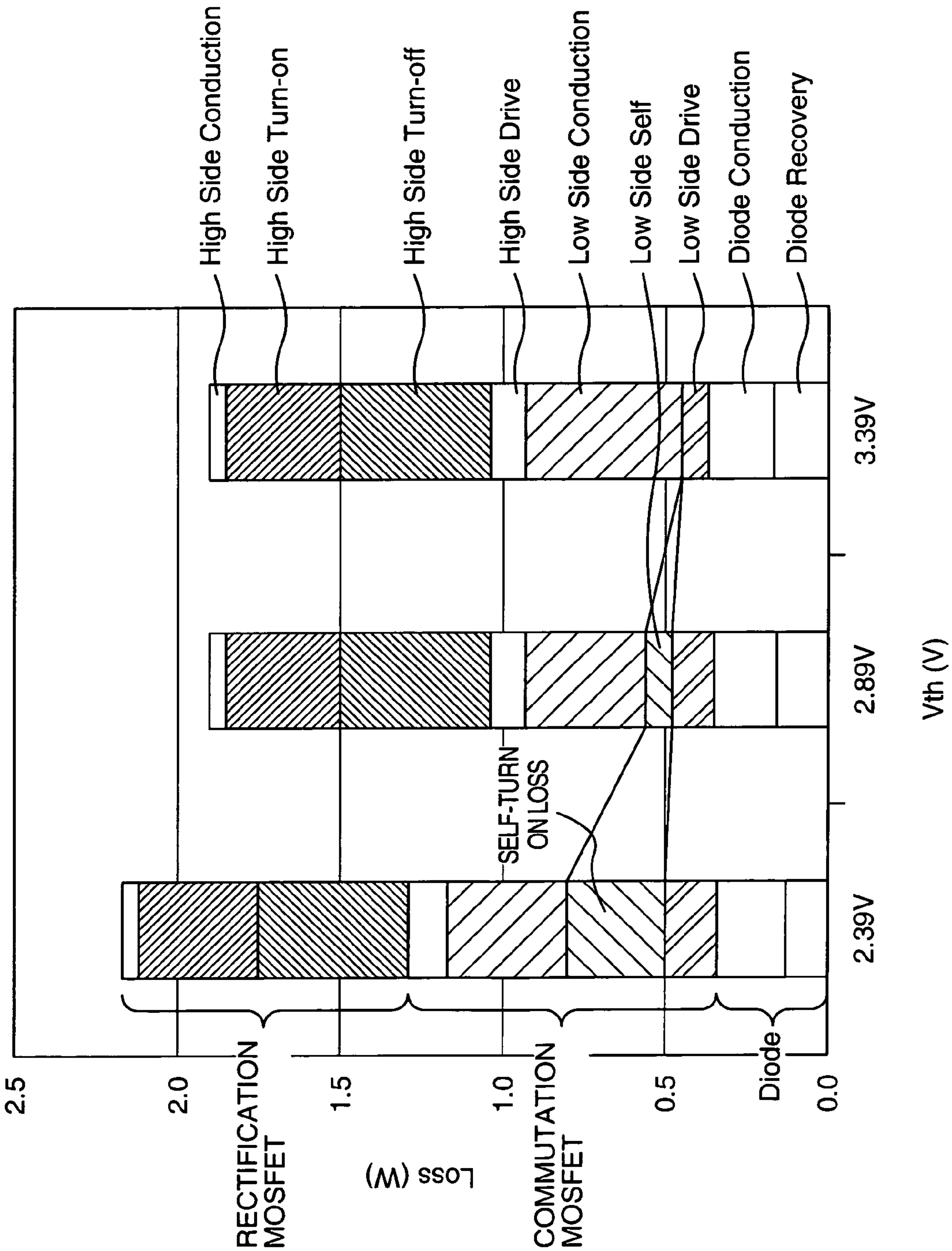
FIG. 12 is a graph explaining the relation of a threshold value and the loss of the MOSFET used in the power supply of the present invention.

FIG. 12 shows the relation of the threshold value and the loss component of the power supply of the present invention. Items in each bar of the graph shown in FIG. 12 represent the conduction loss, the turn-on loss, the turn-off loss and the drive loss of the rectification MOSFET 2, the conduction loss, the self-turn on loss and the drive loss of the commutation MOSFET 3, the conduction loss of diodes 2A and 3A and the recovery loss of the diodes 2A and 3A in order from the above.

As shown in FIG. 12, as the threshold value is higher, the total loss is made smaller. As observed in the items, when the threshold value is low (2.39V), the self-turn on loss of the commutation MOSFET 3 is large, whereas when the threshold value is higher (3.39V), the self-turn on loss of the commutation MOSFET 3 does not occur. On the other hand, the conduction loss of the commutation MOSFET 3 is increased with increase of the threshold value. However, since the reduced amount of the self-turn on loss is larger than the increased amount of the conduction loss, the power efficiency is improved as shown in FIG. 11.

Figure 13A:
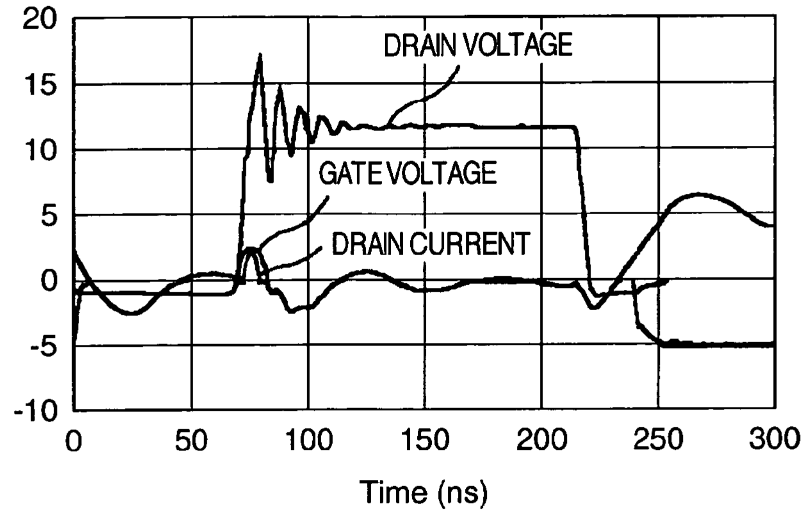
FIGS. 13A, 13B and 13C are diagrams showing current and voltage waveforms of the MOSFET used in the power supply of the present invention.
Figure 13B:
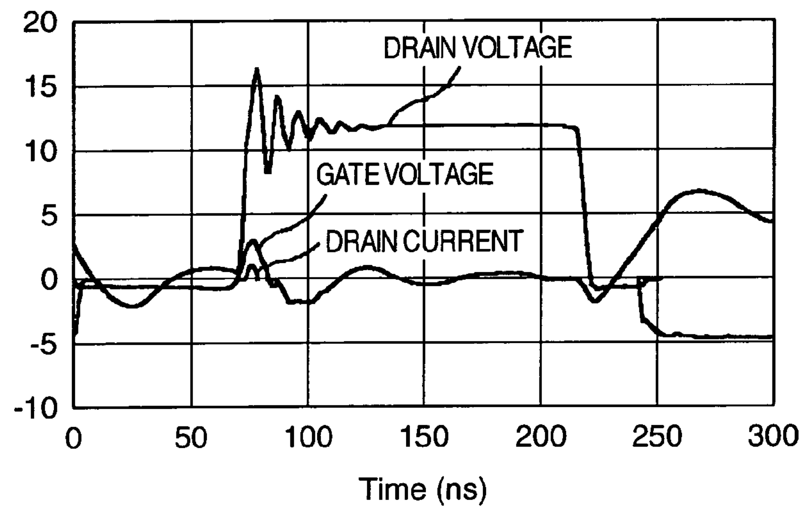
Figure 13C:
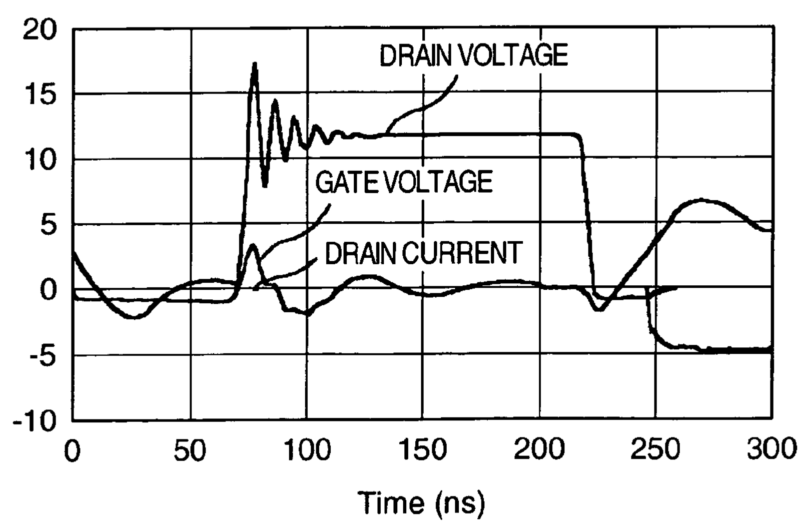

FIGS. 13A, 13B and 13C show drain voltages, drain currents and gate voltages of the commutation MOSFET 3 changed when the rectification MOSFET 2 is turned on in the power supply of the present invention. When the threshold value is 2.39V as shown in FIG. 13A, the drain voltage rises to thereby increase the gate voltage through the feedback capacitance so that the gate voltage exceeds the threshold value and accordingly the drain current flows. Since the drain current flows in case where the drain voltage is high, large loss occurs. When the threshold value is 2.89V as shown in FIG. 13B, the drain voltage rises to thereby increase the gate voltage through the feedback capacitance so that the gate voltage exceeds the threshold value and accordingly the drain current flows, although since the magnitude of the drain current is smaller as compared with the case of FIG. 13A, the produced loss is also smaller. When the threshold value is 3.39V as shown in FIG. 13C, the gate voltage is increased, although the drain current does not flow. That is, no loss occurs.

As described above, in the power supply of the present invention, the self-turn on phenomenon can be suppressed to improve the power efficiency without increase of the drive loss.

Description is now made to the desirable difference in the threshold values between the rectification MOSFET 2 and the commutation MOSFET 3. The threshold values of the rectification MOSFET 2 and the commutation MOSFET 3 are scattered within the range of ±0.5V for the design value in the mass production line. Accordingly, when the scattering is considered, it is preferable that the threshold value of the commutation MOSFET 3 is made 0.5V or more higher than that of the rectification MOSFET 2.

Definite numerical values of the threshold values of the rectification MOSFET 2 and the commutation MOSFET 3 are now described. It is desirable to increase a transconductance gm in order to reduce the switching loss of the rectification MOSFET 2. In order to increase the transconductance gm, it is effective to reduce the threshold value of the rectification MOSFET 2. More particularly, it is desirable to reduce the threshold value of the rectification MOSFET 2 to 1.5V or less and the threshold value of the commutation MOSFET 3 is set to 2.0V or more.

In order to more exactly reduce the loss of the power supply of the present invention, it is desirable that the threshold value of the commutation MOSFET 3 is made 1.0V or more higher than that of the rectification MOSFET 2. This reason is that when the rectification MOSFET 2 is turned on, the overshoot of the drain voltage of the commutation MOSFET 3 is increased in case where a wiring inductance of the power supply is large, so that the self-turn on phenomenon is apt to occur. More particularly, this corresponds to the case where the total wiring inductance of a main circuit of the power supply exceeds 10 nH.

In order to make small the power supply, it is effective to mount the rectification MOSFET 2 and the commutation MOSFET 3 into the same package. In this case, the rectification MOSFET 2 and the commutation MOSFET 3 are selected so as to satisfy the condition of the present invention and mounted into the same package. The same is applied to the case where a drive IC for driving the MOSFETs is also mounted in the same package in addition to the rectification MOSFET 2 and the commutation MOSFET 3.

In the embodiment of the present invention, an n-channel type MOSFET is used for the rectification MOSFET 2, although it is needless to say that a p-channel type MOSFET can be used.

As described above, the power supply of the present invention can suppress the self-turn on phenomenon of the MOSFET and improve the power efficiency without increase of the drive loss.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A power supply of a synchronous rectification type including a DC input power supply, a first insulated gate type power semiconductor element having one main terminal connected to a high potential side of the DC input power supply and a second insulated gate type power semiconductor element having one main terminal connected to the other main terminal of the first insulated gate type power semiconductor element and the other main terminal connected to a low potential side of the DC input power supply, a coil having one terminal connected to the other main terminal of the first insulated gate type power semiconductor element, an output condenser having one terminal connected to the other terminal of the coil and the other terminal connected to the other main terminal of the second insulated gate type power semiconductor element, a load having one terminal connected to the other terminal of the coil and the other terminal connected to the other main terminal of the second insulated gate type power semiconductor element, and a control circuit for driving gates of the first and second insulated gate type power semiconductor elements, wherein an absolute value of a threshold voltage of said second insulated gate type power semiconductor element is higher than that of said first insulated gate type power semiconductor element.

2. A power supply according to claim 1, wherein a DC voltage lower than a voltage of said DC input power supply is outputted.

3. A power supply of a synchronous rectification type including a DC input power supply, a rectification MOSFET having one main terminal connected to a positive potential side of the DC input power supply, a commutation MOSFET having one main terminal connected to the other main terminal of the rectification MOSFET and the other main terminal connected to a negative potential side of the DC input power supply, a choke coil having one terminal connected to the other main terminal of the rectification MOSFET, an output condenser having one terminal connected to the other terminal of the choke coil and the other terminal connected to the other main terminal of the commutation MOSFET, a load having one terminal connected to the other terminal of the choke coil and the other terminal connected to the other main terminal of the commutation MOSFET, and a control circuit for driving gates of the rectification and commutation MOSFETs, wherein an absolute value of a threshold voltage of said commutation MOSFET is higher than that of said rectification MOSFET.

4. A power supply according to claim 3, wherein a DC voltage lower than a voltage of said DC input power supply is outputted.

5. A power supply according to claim 3, wherein the absolute value of the threshold voltage of said commutation MOSFET is 0.5V or more higher than that of said rectification MOSFET.

6. A power supply according to claim 3, wherein the absolute value of the threshold voltage of said commutation MOSFET is equal to or smaller than 1.5V and the absolute value of the threshold value of said commutation MOSFET is equal to or larger than 2.0V.

7. A power supply according to claim 3, wherein a total of wiring inductance of a main circuit of said power supply is equal to or larger than 10 nH, the absolute value of the threshold voltage of said commutation MOSFET is equal to or smaller than 1.5V, the absolute value of the threshold voltage of said commutation MOSFET being equal to or larger than 2.5V.

8. A power supply of a synchronous rectification type including a DC input power supply, a rectification MOSFET having one main terminal connected to a high potential side of the DC input power supply, a commutation MOSFET having one main terminal connected to the other main terminal of the rectification MOSFET and the other main terminal connected to a low potential side of the DC input power supply, a coil having one terminal connected to the other main terminal of the rectification MOSFET, an output condenser having one terminal connected to the other terminal of the coil and the other terminal connected to the other main terminal of the commutation MOSFET, a load having one terminal connected to the other terminal of the coil and the other terminal connected to the other main terminal of the commutation MOSFET, and a control circuit for driving gates of the rectification and commutation MOSFETs, wherein an absolute value of a threshold voltage of said commutation MOSFET is higher than that of said rectification MOSFET and self-turn on loss of said commutation MOSFET is smaller than conduction loss of said commutation MOSFET.

9. A power supply according to claim 8, wherein a DC voltage lower than a voltage of said DC input power supply is outputted.

10. A power supply according to claim 9, wherein the absolute value of the threshold voltage of said commutation MOSFET is 0.5V or more higher than that of said rectification MOSFET.

* * * * *